(12) United States Patent
Rottenberg

(10) Patent No.: US 10,656,087 B2
(45) Date of Patent: May 19, 2020

(54) DETECTION OF FLUID ABSORPTION SPECTRUM

(71) Applicant: IMEC VZW, Leuven (BE)

(72) Inventor: Xavier Rottenberg, Kessel-Lo (BE)

(73) Assignee: IMEC VZW, Leuven (BE)

( * ) Notice: Subject to any disclaimer, the term of this patent is extended or adjusted under 35 U.S.C. 154(b) by 8 days.

(21) Appl. No.: 15/580,265

(22) PCT Filed: Jun. 30, 2016

(86) PCT No.: PCT/EP2016/065313
§ 371 (c)(1),
(2) Date: Dec. 6, 2017

(87) PCT Pub. No.: WO2017/001565
PCT Pub. Date: Jan. 5, 2017

(65) Prior Publication Data
US 2018/0164214 A1   Jun. 14, 2018

(30) Foreign Application Priority Data
Jun. 30, 2015   (EP) ..................................... 15174695

(51) Int. Cl.
*G01N 21/59*   (2006.01)
*G01N 21/31*   (2006.01)
(Continued)

(52) U.S. Cl.
CPC ........ *G01N 21/59* (2013.01); *B01L 3/502715* (2013.01); *G01N 21/31* (2013.01);
(Continued)

(58) Field of Classification Search
CPC ............. B01L 3/502715; G01N 21/31–21/314
See application file for complete search history.

(56) References Cited

U.S. PATENT DOCUMENTS 5,444,807 A  *  8/1995  Liu ........................ G01N 30/74
                                                    204/452
7,186,567 B1     3/2007  Sutherland et al.
(Continued)

FOREIGN PATENT DOCUMENTS

CN      104655566 A     5/2015
EP      2 913 663 A1    9/2015
(Continued)

OTHER PUBLICATIONS

PCT International Search Report and Written Opinion, PCT International Application No. PCT/EP2016/065313, dated Oct. 18, 2016, pp. 17 pages.
(Continued)

*Primary Examiner* — Rebecca C Bryant
(74) *Attorney, Agent, or Firm* — McDonnell Boehnen Hulbert & Berghoff LLP

(57) ABSTRACT

The present disclosure relates to a device for measuring an optical absorption property of a fluid as function of wavelength. The device comprises a broadband light source for emitting light, a plurality of integrated optical waveguides for guiding this light, and a light coupler for coupling the emitted light into the integrated optical waveguides such that the light coupled into each integrated optical waveguide has substantially the same spectral distribution. The device also comprises a microfluidic channel for containing the fluid, arranged such as to allow an interaction of the light propagating through each waveguide with the fluid in the microfluidic channel. Each integrated optical waveguide comprises an optical resonator for filtering the light guided by the waveguide according to a predetermined spectral component. The spectral component corresponding to each waveguide is substantially different from the spectral component corresponding to another of the waveguides.

17 Claims, 2 Drawing Sheets

(51) Int. Cl.
  *B01L 3/00* (2006.01)
  *G01N 21/552* (2014.01)
  *G01N 21/61* (2006.01)
  *G01N 21/3577* (2014.01)
  *G01N 21/03* (2006.01)
  *G01N 21/77* (2006.01)

(52) U.S. Cl.
  CPC .... *G01N 21/552* (2013.01); *B01L 2300/0816* (2013.01); *B01L 2400/0406* (2013.01); *B01L 2400/0457* (2013.01); *B01L 2400/0487* (2013.01); *G01N 21/3577* (2013.01); *G01N 21/61* (2013.01); *G01N 21/7746* (2013.01); *G01N 2021/0346* (2013.01); *G01N 2021/3137* (2013.01); *G01N 2021/3166* (2013.01); *G01N 2021/3181* (2013.01); *G01N 2201/062* (2013.01); *G01N 2201/066* (2013.01); *G01N 2201/0633* (2013.01); *G01N 2201/0636* (2013.01); *G01N 2201/0873* (2013.01)

(56) References Cited

U.S. PATENT DOCUMENTS

| | | |
|---|---|---|
| 2006/0165342 A1 | 7/2006 | Pau et al. |
| 2013/0261010 A1* | 10/2013 | Bailey ................... G01N 27/72 506/9 |
| 2014/0140655 A1 | 5/2014 | Chakravarty et al. |
| 2016/0356720 A1* | 12/2016 | Van Dorpe .......... A61B 5/0066 |

FOREIGN PATENT DOCUMENTS

| | | |
|---|---|---|
| WO | 2006/010367 A2 | 2/2006 |
| WO | 2013/053930 A1 | 4/2013 |

OTHER PUBLICATIONS

Balslev, S. et al., "Fully Integrated Optical Systems for Lab-on-a-Chip Applications", Optoelectronic Integration Silicon II, Proceedings of SPIE, vol. 5730, 2005, pp. 211-217.

Ryckeboer, E. et al., "Glucose Sensing by Waveguide-Based Absorption Spectroscopy on a Silicon Chip", Biomedical Optics Express, vol. 5, No. 5, Apr. 24, 2014, pp. 1636-1648.

Nitkowski, Arthur et al., "Cavity-Enhanced On-Chip Absorption Spectroscopy Using Microring Resonators", Optics Express, vol. 16, No. 16, Aug. 4, 2008, pp. 11930-11936.

Barrios, Carlos Angulo, "Integrated Microring Resonator Sensor Arrays for Labs-on-Chips", Analytical and Bioanalytical Chemistry, vol. 403, No. 6, Mar. 30, 2012, pp. 1467-1475.

* cited by examiner

DETECTION OF FLUID ABSORPTION SPECTRUM

CROSS-REFERENCE TO RELATED APPLICATION

The present application is a national stage entry of PCT/EP2016/065313 filed Jun. 30, 2016, which claims priority to European Patent Application No. 15174695.5 filed Jun. 30, 2015, the contents of which are hereby incorporated by reference.

FIELD OF THE DISCLOSURE

The present disclosure relates to the field of measurements of optical absorption in fluids as function of wavelength, in integrated circuitry devices. More specifically it relates to a device for measuring an optical absorption property of a fluid as function of wavelength.

BACKGROUND

Integrated circuits may be used for the measurement of optical absorption properties of fluids, such as gases or biological fluids, as function of wavelength using integrated optical waveguides. The fluid being analyzed may for example be introduced in an integrated microfluidic channel that is arranged such as to allow an interaction with electromagnetic radiation propagating through an integrated waveguide structure, for example such a structure in or on an integrated photonics substrate. These measurements may be used to obtain colorimetric information pertaining to a fluid sample. While few spectral data samples may be sufficient to characterize a target compound in the fluid sample in some applications, in some example embodiments, a high spectral resolution may be used to accurately characterize a fluid in many situations, e.g. to accurately determine a concentration of the target analyte. For example, while a transmission peak at a predetermined wavelength may be highly sensitive to the concentration of the target analyte in the sample, changes in absorption are often associated with wavelength shifts, such that a good spectral resolution may also be used to accurately determining the concentration.

Particularly, highly sensitive optical absorption measurements as function of wavelength, e.g. forming an absorption spectrum of sufficient spectral resolution for the intended purpose, may be used for detecting biological and/or chemical agents in the sample being analyzed, e.g. for the detection of target analytes such as proteins, antigens or antibodies. Applications of such measurements may include for example environmental monitoring, toxicology, medical diagnostics and gas sampling.

It is known to couple the light emitted by a light source into an integrated waveguide, e.g. a waveguide such as a slab waveguide or rib waveguide integrated in a photonic circuit. The waveguide may have a section of a substantial length, which is arranged in close proximity to the material under test. The tested material may for example be introduced into a microfluidic channel that is arranged sufficiently close to this waveguide section such that an interaction of the light conducted in the waveguide can occur with the material in the microfluidic channel, e.g., but not limited thereto, an interaction of the evanescent field of the light propagating in the waveguide. Then, the light, having its physical properties, such as its wavelength distribution, altered by the interaction with the fluid, may be analyzed in order to obtain information relating to the fluid, e.g. using a photospectrometer.

SUMMARY

It is an object of embodiments of the present disclosure to provide good, inexpensive and/or efficient multi-spectral measurements, in an integrated device, of optical absorption properties of a fluid.

The above objective is accomplished by a method and device according to embodiments of the present disclosure.

In a first aspect, the present disclosure relates to a device for measuring an optical absorption property of a fluid as a function of wavelength. The device comprises a broadband light source for emitting light and a plurality of integrated optical waveguides for guiding the light. Each integrated optical waveguide comprises an optical resonator for filtering the light guided by the integrated optical waveguide according to a predetermined spectral component, in which the predetermined spectral component corresponding to each waveguide of the plurality of integrated optical waveguides is substantially different from the predetermined spectral component corresponding to another waveguide of the plurality of integrated optical waveguides. The device further comprises a light coupler for coupling the light emitted by the broadband light source into the plurality of integrated optical waveguides such that the light coupled into each of the integrated optical waveguides has substantially the same spectral distribution, e.g. has the same spectral distribution. The device also comprises a microfluidic channel for containing the fluid. This microfluidic channel is arranged such as to allow an interaction of the light propagating through each of the integrated optical waveguides with the fluid when contained in the microfluidic channel.

In a device according to embodiments of the present disclosure, at least one optical resonator may be arranged such as to filter the light guided by the corresponding integrated optical waveguide after having interacted with the fluid, when the fluid is contained in the microfluidic channel.

In a device according to embodiments of the present disclosure, at least one optical resonator may be arranged such as to allow an interaction of the light in the optical resonator with the fluid.

In a device according to embodiments of the present disclosure, at least one optical resonator may comprise a narrow band resonator and/or a periodic wavelength resonator.

In a device according to embodiments of the present disclosure, at least one optical resonator may comprise an interferometer, a ring resonator and/or a disc resonator.

In a device according to embodiments of the present disclosure, the light coupler may comprise a collimator for collimating the light emitted by the broadband light source into a collimated radiation beam, and a beam shaper for distributing the power of the collimated light over a discrete number of line shaped light fields, in which the beam shaper may be arranged such that each line shaped light field is projected onto a light entry surface of a corresponding waveguide of the plurality of integrated optical waveguides.

In a device according to embodiments of the present disclosure, the collimator may have a parabolic shape, a conic shape or a horn-like shape.

In a device according to embodiments of the present disclosure, the beam shaper may have a wedge shape, and the collimator and the beam shaper may be arranged such that the beam shaper can receive light from the collimator via a wedge entrance area forming a short side of the wedge.

In a device according to embodiments of the present disclosure, each waveguide of the plurality of integrated optical waveguides may be configured to keep the light travelling along different waveguides physically separate.

In a device according to embodiments of the present disclosure, at least one waveguide of the plurality of integrated optical waveguides may be curved in an interaction portion where the light propagating through the integrated optical waveguides can interact with the fluid when contained in the microfluidic channel.

In a device according to embodiments of the present disclosure, at least one waveguide of the plurality of integrated optical waveguides may have a spiral-like shape in the interaction portion.

In a device according to embodiments of the present disclosure, the broadband light source may comprise a light emitting diode or a broadband laser.

A device according to embodiments of the present disclosure may further comprise a plurality of photodetectors, in which each photodetector is optically coupled to a corresponding integrated optical waveguide of the plurality of integrated optical waveguides and adapted for receiving the light after being filtered by the corresponding optical resonator.

A device according to embodiments of the present disclosure may further comprise a signal combiner, e.g. a processing unit or processor, adapted for receiving the signal from each of the photodetectors and for generating an aggregated signal representative of the absorption spectrum of the fluid.

In a device according to embodiments of the present disclosure, this signal combiner may furthermore be adapted for generating a signal indicative of a presence and/or a concentration of a predetermined target biological and/or chemical agent in the fluid.

In a second aspect, the present disclosure also relates to a method for measuring an optical absorption property of a fluid as a function of wavelength. This method comprises emitting light using a broadband light source, and coupling the emitted light into a plurality of integrated optical waveguides for guiding the light, e.g. using a light coupler. The emitted light is coupled into the plurality of integrated optical waveguides such that the light coupled into each integrated optical waveguide has substantially the same spectral distribution, e.g. has the same spectral distribution. The method further comprises bringing a fluid to be tested sufficiently close to each waveguide of the plurality of integrated optical waveguides such as to allow an interaction of the light propagating through each waveguide with the fluid. The method further comprises filtering the light guided by each integrated optical waveguide according to a predetermined spectral component using an optical resonator, e.g. an optical resonator integrated in each waveguide, e.g. using a plurality of optical resonators corresponding to the plurality of waveguides. The predetermined spectral component corresponding to each waveguide of the plurality of integrated optical waveguides is substantially different from the predetermined spectral component corresponding to another waveguide of the integrated optical waveguides.

A method according to embodiments of the second aspect of the present disclosure may comprise providing the fluid in a microfluidic channel for containing the fluid that is arranged such as to allow an interaction of the light propagating through each waveguide with the fluid.

In a method according to embodiments of the second aspect of the present disclosure, the filtering of the light may be performed after the interaction of the light with the fluid.

In a method according to embodiments of the second aspect of the present disclosure, the light may interact with the fluid simultaneously with the filtering, e.g. the light in the at least one optical resonator may interact with the fluid.

A method according to embodiments of the second aspect of the present disclosure, may also comprise generating a plurality of signals representative of light intensities of the filtered light in each waveguide, e.g. representative of the plurality of predetermined spectral components of the light.

In a further aspect, the present disclosure may also relate to the use of a device according to embodiments of the first aspect of the present disclosure for the detection and/or quantification of biological and/or chemical agents in the fluid. In embodiments, the present disclosure may also relate to the use of a device according to embodiments of the first aspect of the present disclosure for the detection and/or quantification of target analytes such as proteins, antigens or antibodies. In embodiments, the present disclosure may also relate to the use of a device according to embodiments of the first aspect of the present disclosure for environmental monitoring, toxicology, medical diagnostics and/or gas sampling.

In a further aspect, the present disclosure may also relate to a diagnostic device for providing medical diagnostic information based on measurements of an optical absorption property of a biological fluid sample, e.g. a liquid or gas obtained from the human body, as a function of wavelength. This diagnostic device comprises a device according to embodiments of the first aspect of the present disclosure. The diagnostic device may further comprise a processor adapted for, e.g. programmed and/or configured for, analyzing the measurements provided by the device in accordance with embodiments of the first aspect of the present disclosure to determine at least one medically relevant parameter.

In example embodiments, an efficient substrate area use can be achieved by simultaneously obtaining a set of spectral components of the light and interacting the light with the fluid under test.

In example embodiments, spectral analysis can be integrated into an opto-fluidic chip in a simple and efficient manner.

In example embodiments, a cheap and readily available broadband light source, e.g. a LED, can be used in an integrated device for multi-spectral optical absorption measurement.

In example embodiments, a high coupling efficiency can be achieved of light from a broadband light source, such as a LED, to an integrated waveguide structure, in an integrated device for multi-spectral absorption measurement.

In example embodiments, an overall high etendue acceptance can be achieved in an integrated device for multi-spectral absorption measurement for light emitted by a broadband light source.

Particular aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

Figure 1:
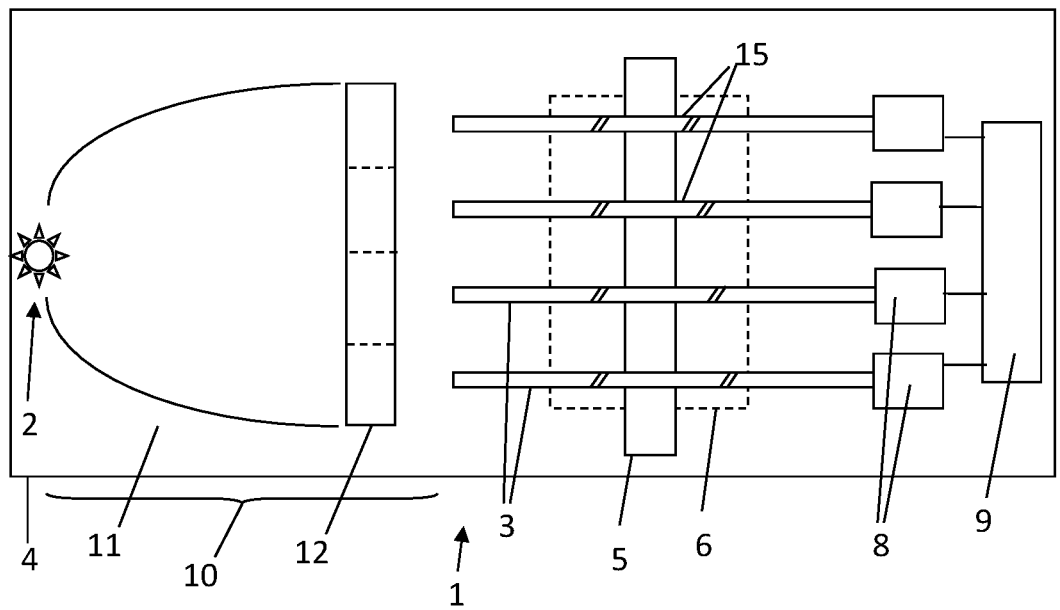
FIG. 1 shows a first exemplary device in accordance with example embodiments.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Where in embodiments of the present disclosure reference is made to "light", reference is made to electromagnetic radiation, e.g. composed of photon wave-particles that can be guided by an integrated waveguide structure in an integrated photonic circuit. This comprises, but is not necessarily limited to, visible light, e.g. electromagnetic radiation in a portion of the electromagnetic spectrum which is visible to the human eye. However, such light may also comprise electromagnetic radiation in a portion of the electromagnetic spectrum corresponding to, for example, infrared light, e.g. near-infrared light, and/or ultraviolet light. Where reference is made to broadband light, reference is made to light having a spectral distribution, e.g. a wavelength distribution of a substantially contiguous and/or continuous spectral component of the light, that has a full width at half maximum of at least 50 nm, e.g. at least 100 nm, or even wider, e.g. at least 200 nm or at least 300 nm.

In a first aspect, the present disclosure relates to a device for measuring an optical absorption property of a fluid as function of wavelength. The device comprises a broadband light source for emitting light, a plurality of integrated optical waveguides for guiding the light, and a light coupler for coupling the light emitted by the broadband light source into the plurality of integrated optical waveguides. The light coupler couples the light into the plurality of integrated optical waveguides such that the light coupled into each integrated optical waveguide has substantially the same spectral distribution. The device also comprises a microfluidic channel for containing the fluid, the microfluidic channel arranged such as to allow an interaction of the light propagating through each integrated optical waveguide with the fluid when contained in the microfluidic channel. Each integrated optical waveguide comprises an optical resonator for filtering the light guided by the integrated optical waveguide according to a predetermined spectral component. The predetermined spectral component corresponding to each waveguide of the integrated optical waveguides is substantially different, e.g. is different, from the predetermined spectral component corresponding to another waveguide of the integrated optical waveguides.

Figure 2:
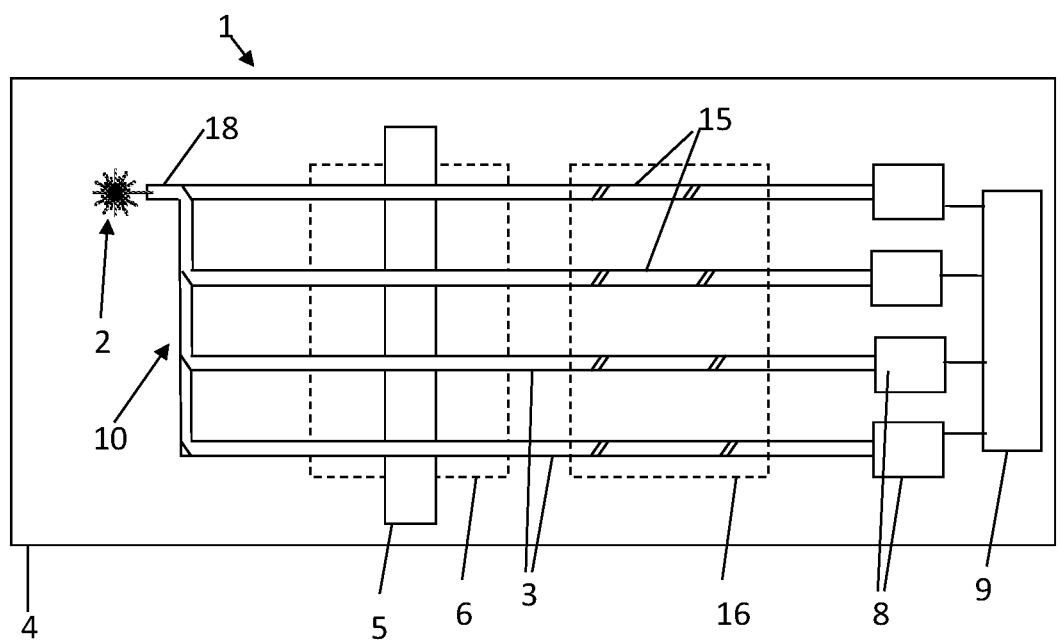
FIG. 2 shows a second exemplary device in accordance with example embodiments.

Exemplary devices 1 in accordance with embodiments of the present disclosure are shown in FIG. 1 and FIG. 2. The device 1 is adapted for measuring an optical absorption property of a fluid as a function of wavelength. The device 1 may be adapted for obtaining colorimetric information pertaining to the fluid. The device 1 may be adapted for performing optical absorption measurements as function of wavelength, e.g. for determining an absorption spectrum of the fluid at a substantial spectral resolution, e.g. comprising determined values indicative of at least 32, e.g. at least 64, or even at least 128, such as at least 256, or even a higher number, e.g. 1000 or more, substantially distinct spectral components of the absorption spectrum. The device 1 may be adapted for detecting a biological and/or chemical agent in the sample being analyzed, e.g. for the detection of target analytes such as proteins, antigens or antibodies. The device 1 may be adapted for use in environmental monitoring, toxicology, medical diagnostics and/or gas sampling.

The device 1 comprises a broadband light source 2 for emitting light. The broadband light source 2 may have a predetermined light emission spectrum, e.g. a known and sufficiently stable spectrum suitable for use as a reference spectrum, such as to enable a measurement of a spectrum of the light after having interacted with the fluid to be tested that is representative of absorption properties of the fluid. The broadband light source 2 may provide a substantially parallel collimated light wave, e.g. comprising substantially planar waves, for example as provided by a broadband laser source. However, the broadband light source 2 may also be a diffuse light source, e.g. the broadband light source may have a spherical spatial light emission distribution, or may have a Lambertian spatial light emission distribution, e.g. such as the light emission distribution of a LED.

This broadband light source 2 may comprise a broadband laser, for example as illustrated in FIG. 2. The broadband light source 2 may be a high quality broadband laser. In example embodiments, a light source may be used that has a low source etendue, e.g. that can be easily and efficiently coupled into the plurality of waveguides.

However, the broadband light source 2 may also be a cheap wideband light source such as a light emitting diode (LED), e.g. as illustrated in FIG. 1. In example embodiments, such cheap light source can be used even though the etendue of such source when coupled into a single integrated waveguide would be unfavorable. In example embodiments, a cheap and easily integratable light source can be used in an efficient and accurate absorption spectrum analysis device.

The device 1 further comprises a plurality of integrated optical waveguides 3 for guiding, e.g. for conducting, the light from the light source 2. For example, the device 1 may comprise an integrated photonics substrate 4, and the plurality of integrated optical waveguides 3 may be provided in or on this integrated photonics substrate 4. The plurality of integrated optical waveguides may comprise a slab waveguide and/or a rib waveguide, e.g. a plurality of slab or rib waveguides provided in or on the integrated photonics substrate 4.

The number of integrated optical waveguides in the plurality of integrated optical waveguides 3 may be in the range of 10 to 10,000,000. The plurality of integrated optical waveguides 3 may comprise at least 10 integrated optical waveguides, e.g. at least 100 integrated optical waveguides, or an even higher number of integrated optical waveguides, e.g. 1000, 10000, 100000, or even between 100000 and 10000000 integrated optical waveguides.

The plurality of integrated optical waveguides 3 may be arranged substantially parallel, in a geometrical sense, in at least a light receiving portion where the light emitted by the broadband light source 2 is coupled into the plurality of integrated optical waveguides 3. For example, each integrated optical waveguide 3 may be adapted for guiding light in a longitudinal direction along the waveguide, the longitudinal directions of the waveguides being arranged substantially parallel in the light receiving portion. Thus, each waveguide of the plurality of integrated optical waveguides 3 may comprise a light receiving portion adapted for coupling the light into the waveguide, in which the light receiving portions of the plurality of integrated optical waveguides may be arranged substantially parallel with respect to each other.

The plurality of integrated optical waveguides 3 may be parallel waveguides, in a functional sense, e.g. the plurality of integrated optical waveguides 3 may be arranged and/or configured such as to prevent interaction, e.g. mixing, combining and/or splitting, of light travelling along different waveguides after the light has been coupled into the waveguide. Thus, the waveguides of the plurality of integrated optical waveguides 3 may be configured to keep the light travelling along different waveguides physically separate.

The device 1 also comprises a microfluidic channel 5 for containing the fluid to be tested. For example, the microfluidic channel 5 may be formed in or on an integrated photonic substrate 4. The fluid may comprise a gas or a liquid, e.g. a biological fluid. For example, the microfluidic channel may be adapted for containing a gas or a liquid, such as a biological fluid. The microfluidic channel 5 is arranged such as to allow an interaction of the light propagating through each of the integrated optical waveguides 3 with the fluid when contained in the microfluidic channel 5. The fluid to be tested may for example be introduced into the microfluidic channel 5, the microfluidic channel 5 having a portion that is arranged sufficiently close to the waveguides 3 such that an interaction of the light conducted in the waveguides can occur with the material in the microfluidic channel, e.g., but not limited thereto, an interaction of the evanescent field of the light.

The microfluidic channel 5 may comprise a micro-cuvette, and/or a reservoir for receiving the fluid to be tested. The microfluidic channel 5 may comprise a pump, e.g. an active means for transporting the fluid from a fluid receiving section, such as a reservoir or a micro-needle, through the channel, or may be adapted for passively transporting the fluid through channel, e.g. by means of capillary action, gravity and/or an externally applied pressure gradient. The microfluidic channel 5 is arranged such as to allow an interaction of the light propagating through each of the integrated optical waveguides 3 with the fluid, when introduced into the microfluidic channel. For example, the integrated optical waveguides may have an interaction portion, e.g. a section of a substantial length, for example a respective waveguide section in an exposure zone 6, which is arranged in close proximity to the microfluidic channel 5, and thus close to the fluid under test when the device is operational.

The integrated optical waveguides, for instance each integrated optical waveguide, comprise an optical resonator 15 for filtering the light guided by the integrated optical waveguide 3 according to a predetermined spectral component. For example, each integrated optical waveguide may be coupled to an optical resonator, at least a part of which is formed by a segment of the waveguide. The predetermined spectral component corresponding to each waveguide of the integrated optical waveguides may be substantially different, e.g. is different, from the predetermined spectral component corresponding to another waveguide of the integrated optical waveguides.

For example, each optical resonator 15 may comprise a narrow band resonator, e.g. adapted for attenuating light wavelengths outside a narrow spectral band corresponding to the predetermined spectral component having a predetermined peak wavelength and bandwidth. Each optical resonator 15 may also comprise a periodic wavelength resonator, e.g. adapted for filtering light wavelengths in accordance with a periodic wavelength transfer function corresponding to the predetermined spectral component. Thus, a Fourier-like spectral analysis may be carried out by measuring the output amplitude or intensity of the filtered light provided by the plurality of waveguides.

At least one optical resonator 15, e.g. each optical resonator 15 of the respective integrated optical waveguides 3, may be arranged such as to filter the light guided by the corresponding integrated optical waveguide after having interacted with the fluid, e.g. as shown in FIG. 2. For example, the waveguides may be configured such as to first allow an interaction of light received from the light source 2 with the fluid in an exposure zone 6, e.g. an interaction of the evanescent field of the light propagating in the waveguide 3 with the fluid in the microfluidic channel 5, and then filter the light, e.g. having a spectral composition carrying information about the absorption spectrum of the fluid, by the optical resonator 15, e.g. in a spectral analysis zone 16.

The at least one optical resonator 15, e.g. each optical resonator 15 of the respective integrated optical waveguides 3, may also be arranged such as to allow an interaction of the light in the optical resonator with the fluid, e.g. the optical waveguide may be arranged such as to filter the light guided by the corresponding integrated optical waveguide while interacting with the fluid, e.g. as shown in FIG. 1. Thus, at least one optical resonator 15 may be arranged such as to allow an interaction of the light with the fluid contained in the microfluidic channel 5, while the light is being filtered. For example, the waveguides 3 may be configured such as to simultaneously allow an interaction of the light received from the light source 2 with the fluid in an exposure zone 6, e.g., but not limited thereto, an interaction of the evanescent field of the light propagating in the waveguide 3, and filter the light, e.g. having a spectral composition carrying information about the absorption spectrum of the fluid, by the optical resonator 15, e.g. in the exposure zone 6. In example embodiments, an efficient substrate area use can be achieved by simultaneously obtaining a set of spectral components of the light and interacting the light with the fluid under test.

While FIG. 1 shows a device that comprises a LED light source and in which the optical resonators 15 are arranged such as to allow an interaction of the light in the optical resonator with the fluid, and FIG. 2 shows a device that comprises a broadband laser light source and in which the optical resonators 15 are arranged such as to filter the light after having interacted with the fluid, embodiments of the present disclosure are not limited to these specific combinations. For example, embodiments of the present disclosure may also relate to a device that comprises a broadband laser light source and in which the optical resonators are arranged such as to allow an interaction of the light in the optical resonator with the fluid, or to a device that comprises a LED light source and in which the optical resonators are arranged such as to filter the light after having interacted with the fluid.

The optical resonator 15 may comprise an interferometer, such as a Fabry-Perot interferometer. For example, the optical resonator 15 may comprise an optical cavity formed in the integrated optical waveguide 3. The respective optical resonators 15 in respective optical waveguides 3 may be configured to filter different spectral components, e.g. by varying the optical length of the respective optical cavities. For example, each waveguide 3 may comprise a section having a different length with respect to the other waveguides, in which the ends of this section are determined by reflective element, e.g. a distributed Bragg reflector. Thus, light may be filtered in the waveguide through constructive and destructive interference of light waves dependent on a wavelength resonance determined by the optical length of the cavity.

However, the optical resonator 15 may also comprise another type of optical resonator suitable for filtering the light spectrum in the waveguide, such as, for example, a whispering gallery resonator, a ring resonator, e.g. a microtoroid resonator, a microsphere resonator or a disc resonator.

At least one of the integrated optical waveguides 3 may be curved in an interaction portion where the light propagating through the integrated optical waveguides 3 can interact with the fluid when contained in the microfluidic channel 5. For example, this interaction portion of each waveguide 3 may be a section that is arranged in close proximity to the microfluidic channel 5.

The interaction portion may be a curved section 7 of the waveguide having an extrinsic curvature of at least the reciprocal of the diameter of the microfluidic channel 5. This curved section 7 may form part of the optical resonator 15, e.g. in embodiments where filtering and interaction with the fluid can occur simultaneously, or may be in a separate part of the waveguide, e.g. in embodiments where interaction with the fluid and filtering of the light can occur consecutively.

For example, the longitudinal axis of the waveguide, e.g. corresponding to the principal direction of light conduction in the waveguide, may have an extrinsic curvature, in the curved section 7, of at least the reciprocal of the diameter of the microfluidic channel 5.

Figure 3:
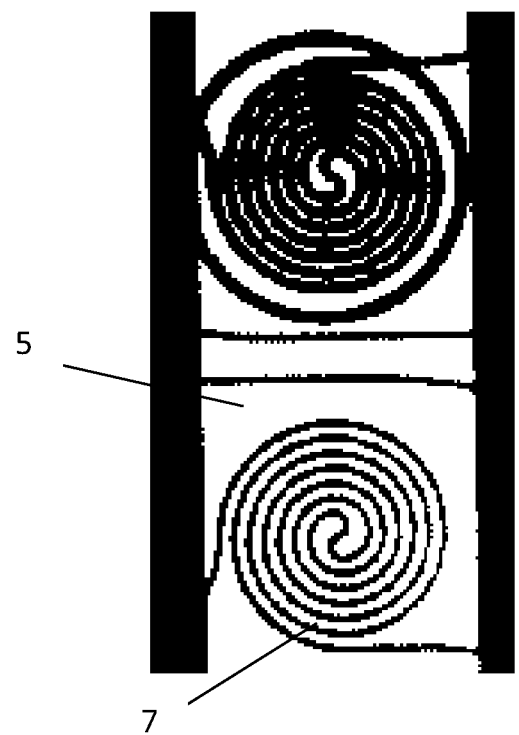
FIG. 3 shows waveguides having a spiral-like shape in an interaction portion thereof in a device according to example embodiments.

For example, as shown in FIG. 3, the waveguide may have a spiral-like shape, e.g. a serpentine shape, in the interaction portion, e.g. in order to enable an interaction of the light propagating through the waveguide with the fluid in the microfluidic channel over a length of the waveguide that is larger than the diameter of the microfluidic channel, e.g. that is at least 5 times larger, e.g. at least 10 times larger. The interaction portion may be separate from or overlap with the optical resonator 15.

The device 1 further comprises a light coupler 10 for coupling the light emitted by the broadband light source 2 into the plurality of integrated optical waveguides 3.

For example, the light coupler 10 may comprise a beam splitter for distributing the power of the light in an input waveguide over the plurality of integrated optical waveguides 3, as shown in FIG. 2. The input waveguide 18 may for example be optically coupled to the light source 2, e.g. a low etendue broadband light source, such as a broadband laser.

The light coupler 10 may also comprise a collimator 11 for collimating the light emitted by the broadband light source into a collimated radiation beam, and a beam shaper 12 for distributing the power of the collimated light over a discrete number of line shaped fields, each line shaped field being projected onto an light entry surface of a corresponding waveguide of the plurality of integrated optical waveguides. For example, the light source 2 may be a high etendue broadband light source, such as a LED, and the collimator 11 may be configured to provide a light beam having substantially planar wavefronts over a large area, e.g. corresponding to the area of an input surface of the beam shaper 12. For example, the large area may correspond to an area of at least 1 mm$^2$, e.g. of the order of 1 cm$^2$, or even larger, e.g. in the range of 1 cm$^2$ to 3 cm$^2$.

For example, the light entry surface of each waveguide may be a polished facet suitable for coupling light into the waveguide. In other embodiments, the light entry surface may be provided with a waveguide coupler, e.g. an integrated waveguide coupler, e.g. a grating coupler, to obtain a good coupling efficiency of the line shaped light field projected onto the entry surface to at least one light propagation mode of the waveguide.

At least part of the collimator 11 may for example have a parabolic shape, e.g. three-dimensional parabolic shape, a conic shape or horn-like shape.

In embodiments of the present disclosure, the beam shaper 12 may comprise a structured transparent slab, comprising a plurality of light separating lamellae, e.g. reflective lamellae for reflecting light away from the lamellae and generally toward the nearest line shaped light field, as schematically shown in FIG. 1.

Figure 4:
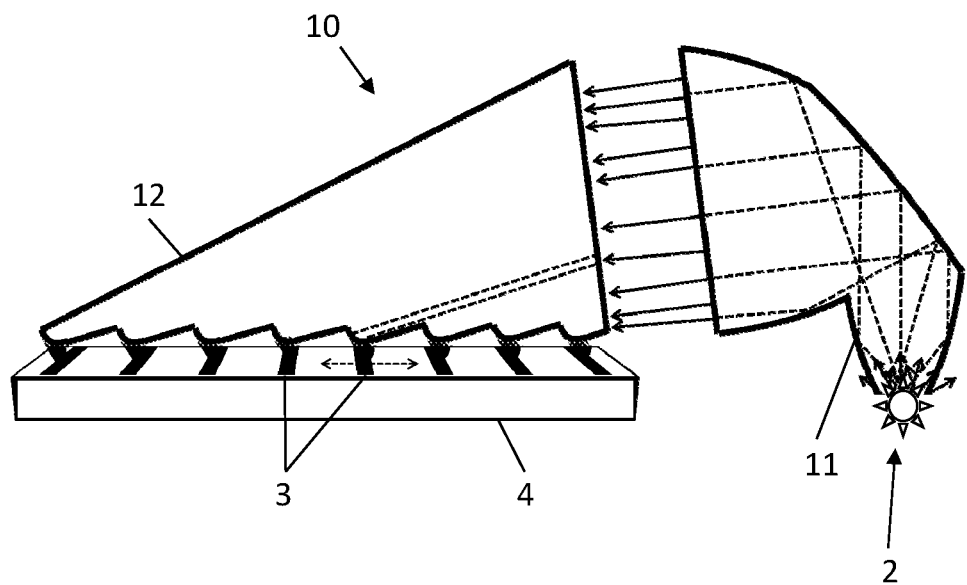
FIG. 4 shows a light coupler comprising a beam shaper and a collimator in a device according to example embodiments.

In embodiments of the present disclosure, the beam shaper 12 may have a wedge shape, e.g. as illustrated in FIG. 4. The collimator and the beam shaper may be arranged such that the beam shaper can receive light from the collimator 11, e.g. via a wedge entrance area forming a short side of the wedge. The beam shaper may be shaped such that light incident orthogonally at a wedge entrance area is guided directly to the wedge exit area without first being reflected at another surface of the wedge.

The beam shaper 12 may comprise an exit area for directing the light to the discrete number of line shaped fields, the exit area having a waved or stepped pattern, e.g. as shown in FIG. 4.

For example, the light coupler 10 may correspond to an optical radiation guiding system as disclosed in European patent application EP14157397.2, filed on 28 Feb. 2014 by IMEC vzw, and incorporated herein by reference. Specific features of the beam shaper and/or collimator disclosed in EP14157397.2 may be included in a device according to embodiments of the present disclosure for which protection is sought. Effects of an optical radiation guiding system according to the previously filed patent application may contribute to solving a technical problem underlying the present disclosure.

The device 1 according to embodiments of the present disclosure may also comprise a plurality of photodetectors 8. Each photodetector may be optically coupled to a corresponding integrated optical waveguide 3 such as to, in operation, receive the light after interaction of the light with the fluid and after being filtered by the corresponding optical resonator 15. Furthermore, each photodetector 8 may be adapted for generating a signal representative of the predetermined spectral component of the light provided by the corresponding optical resonator 15.

The device may also comprise a plurality of photodetectors 8. Each spectral analysis device is optically coupled to a corresponding integrated optical waveguide 3 and adapted for receiving the light from the integrated optical waveguide after being filtered by the corresponding optical resonator 15. The optical resonators 15 may be adapted for decomposing the broad light spectrum of the light, during or after interaction with the sample, into spectral components, e.g. each component being provided by another optical resonator 15. The corresponding photodetector 8 may be adapted for transducing the corresponding spectral component into a signal, e.g. an electronic signal, such as an analog or digital electrical signal.

Each photodetector 8 may be adapted for generating a signal representative of a spectral component of the light. For example, the signal may be a digital signal or a plurality of analog electronic signals. The signal may be indicative of, e.g. proportional to, a number of photon counts.

The device 1 may also comprise a signal combiner 9, e.g. for performing an averaging or summing operation, adapted for receiving the signal from each of the photodetectors 8 and for generating, e.g. for generating and outputting, an aggregate signal representative of the absorption spectrum of the fluid.

The signal combiner 9 may for example comprise a processing unit, e.g. a processor, such as a general purpose processing unit, e.g. a central processing unit (CPU) or accelerated processing unit (APU), or an application specific integrated circuit (ASIC). The signal combiner may comprise an analog to digital converter. The signal combiner may comprise an arithmetic logic unit (ALU). The signal combiner may comprise an output unit for transmitting, e.g. by means of a communication bus and/or wireless communication module, a signal generated by the signal combiner to an external recipient. The signal combiner may comprise a data storage memory for storing a signal generated by the signal combiner.

The signal combiner 9 may furthermore be adapted for generating a signal indicative of a presence and/or a concentration of a predetermined target biological and/or chemical agent in the fluid. For example, the signal combiner may output a signal indicative of a presence or concentration of a target analyte, or multiple predetermined target analytes, such as proteins, antigens or antibodies. Thus, the device 1 may be adapted for use in environmental monitoring, toxicology, medical diagnostics and/or gas sampling.

In a second aspect, the present disclosure also relates to a method for measuring an optical absorption property of a fluid as a function of wavelength. This method comprises emitting light using a broadband light source 2, and coupling the emitted light into a plurality of integrated optical waveguides 3 for guiding the light, e.g. using a light coupler 10. The emitted light is coupled into the plurality of integrated optical waveguides such that the light coupled into each integrated optical waveguide has substantially the same spectral distribution. The method further comprises bringing a fluid to be tested sufficiently close to each waveguide of the plurality of integrated optical waveguides 3 such as to allow an interaction of the light propagating through each waveguide with the fluid. For example, the method may comprise providing the fluid in a microfluidic channel 5 for containing the fluid that is arranged such as to allow an interaction of the light propagating through each waveguide with the fluid.

The method further comprises filtering the light guided by each integrated optical waveguide according to a predetermined spectral component using an optical resonator 15, e.g. an optical resonator 15 integrated in each waveguide. The predetermined spectral component corresponding to each waveguide of the plurality of integrated optical waveguides 3 is substantially different, e.g. is different, from the predetermined spectral component corresponding to another waveguide of the integrated optical waveguides 3. This filtering of the light may be performed after the interaction of the light with the fluid, or the light may interact with the fluid simultaneously with the filtering.

The method may also comprise generating a plurality of signals representative of light intensities of the filtered light in each waveguide, e.g. representative of the plurality of predetermined spectral components of the light. A method according to embodiments of the present disclosure may be applied using a device according to embodiments of the first aspect of the disclosure. Further features of a method according to embodiments may be clear from the description of a corresponding device according to embodiments of the present provided hereinabove.

A method In accordance with embodiments of the present disclosure may be a method for obtaining colorimetric information pertaining to the fluid. For example, optical absorption measurements may be performed by such method as function of wavelength, e.g. to determine an absorption spectrum of the fluid at a substantial spectral resolution, e.g. comprising determined values indicative of at least 32, e.g. at least 64, or even at least 128, such as at least 256, or even a higher number, e.g. 1000 or more, substantially distinct spectral components of the absorption spectrum. The method may be used for, e.g. may be a method for, detecting a biological and/or chemical agent in the sample being analyzed, for example to detect target analytes such as proteins, antigens or antibodies. A method in accordance with embodiments may be used in environmental monitoring, toxicology, medical diagnostics and/or gas sampling.

This method comprises emitting light using a broadband light source, such as emitting broadband light, e.g. light having a predetermined light emission spectrum. For example, the emitted light may have a known and sufficiently stable spectrum such as to be suitable for use as a reference spectrum, e.g. to enable a measurement of a spectrum of the light after having interacted with the fluid to be tested that is representative of absorption properties of the fluid. Emitting the light may comprise emitting a substantially parallel collimated light wave, e.g. emitting substantially planar waves, for example as obtainable by a broadband laser source. Alternatively, emitting the light may comprise emitting diffuse light, e.g. emitting light having a spherical or Lambertian spatial light emission distribution, e.g. such as obtainable by a LED light source.

The emitted light is coupled into the plurality of integrated optical waveguides such that the light coupled into each integrated optical waveguide has substantially the same spectral distribution. For example, the emitted light may be coupled into a number of integrated optical waveguides, where this number may lie in the range of 10 to 10,000,000, e.g. in the range of 100 to 1,000,000, e.g. in the range of 1,000 to 100,000, e.g. 10,000.

The emitted light may be coupled into the plurality of integrated optical waveguides such that the light coupled into each integrated optical waveguide travels substantially parallel, in a geometrical sense, in at least a light receiving portion where the emitted light is coupled into the plurality of integrated optical waveguides.

The method further comprises bringing a fluid to be tested, e.g. a gas or a liquid, e.g. a biological fluid, near each waveguide of the plurality of integrated optical waveguides such as to allow an interaction of the light propagating through each waveguide with the fluid, e.g. an interaction of the evanescent field of the light, but not necessarily limited thereto. The method may comprise providing the fluid in a microfluidic channel for containing the fluid that is arranged such as to allow an interaction of the light propagating through each waveguide with the fluid. The method may thus comprise introducing the fluid to be tested into the microfluidic channel. The method may thus comprise introducing the fluid into a micro-cuvette and/or a reservoir for receiving the fluid to be tested. The method may comprise actively transporting the fluid, e.g. pumping the fluid, from a fluid receiving section, such as a reservoir or a microneedle, through the microfluidic channel. The method may comprise passively transporting the fluid through the microfluidic channel, e.g. by means of capillary action, gravity and/or an externally applied pressure gradient.

Filtering the light guided by each integrated optical waveguide according to a predetermined spectral component comprises using an optical resonator, such as for example a plurality of optical resonators, each one integrated in a corresponding integrated optical waveguide. The predetermined spectral component corresponding to each waveguide of the plurality of integrated optical waveguides is substantially different, e.g. is different, from the predetermined spectral component corresponding to another waveguide of the integrated optical waveguides. This filtering of the light may be performed after the interaction of the light with the fluid, or the light may interact with the fluid simultaneously with the filtering.

Filtering the light guided by each integrated optical waveguide according to a predetermined spectral component may comprise using a narrow band resonator, e.g. a plurality of such narrow band resonators corresponding to the plurality of integrated optical waveguides. Filtering the light guided by each integrated optical waveguide according to a predetermined spectral component may thus comprise attenuating light wavelengths outside a narrow spectral band corresponding to the predetermined spectral component having a predetermined peak wavelength and bandwidth.

Filtering the light guided by each integrated optical waveguide according to a predetermined spectral component may comprise using a periodic wavelength resonator, e.g. a plurality of such periodic wavelength resonators corresponding to the plurality of integrated optical waveguides. Thus, filtering the light may comprise filtering light wavelengths in accordance with a periodic wavelength transfer function corresponding to the predetermined spectral component. Thus, a Fourier-like spectral analysis may be carried out by measuring the output amplitude or intensity of the filtered light provided by the plurality of waveguides.

Filtering the light guided by each integrated optical waveguide according to a predetermined spectral component may comprise using an interferometer, such as a Fabry-Perot interferometer. For example, the optical resonator may comprise an optical cavity formed in the integrated optical waveguide. Thus, filtering the light may comprise constructive and destructive interference of light waves dependent on a wavelength resonance determined by the optical length of the cavity.

Filtering the light guided by each integrated optical waveguide according to a predetermined spectral component may comprise using a whispering gallery resonator, a ring resonator, e.g. a microtoroid resonator, a microsphere resonator or a disc resonator.

Coupling the emitted light into a plurality of integrated optical waveguides for guiding the light may comprise splitting a light beam in an input waveguide such as to distribute the power of the light over the plurality of integrated optical waveguides.

Coupling the emitted light may also comprise collimating the light emitted by a broadband light source into a collimated radiation beam, and shaping the beam such as to distribute the power of the collimated light over a discrete number of line shaped fields, each line shaped field being projected onto an light entry surface of a corresponding waveguide of the plurality of integrated optical waveguides.

For example, collimating the light may comprise impinging the light on a collimator having a parabolic shape, e.g. three-dimensional parabolic shape, a conic shape or horn-like shape. Shaping the collimated light may comprise projecting the collimated light onto a plurality of light separating lamellae, e.g. reflective lamellae for reflecting light away from the lamellae and generally toward a nearest line shaped light field, as schematically shown in FIG. 1.

The method may comprise decomposing the broad light spectrum of the light, during or after interaction with the fluid sample, into spectral components, e.g. each component being provided by another optical resonator.

The method may also comprise generating a plurality of signals representative of light intensities of the filtered light in each waveguide, e.g. representative of the plurality of predetermined spectral components of the light, for example using a plurality of photodetectors. Thus, generating the plurality of signals may comprise transducing each spectral component into a signal, e.g. an electronic signal, such as an analog or digital electrical signal.

The method may also comprise combining the plurality of signals, e.g. performing an averaging or summing operation, and generating an aggregate signal representative of the absorption spectrum of the fluid. The method may comprise generating a signal indicative of a presence and/or a concentration of a predetermined target biological and/or chemical agent in the fluid. For example, the method may comprise outputting a signal indicative of a presence or concentration of a target analyte, or multiple predetermined target analytes, such as proteins, antigens or antibodies.

In a further aspect, the present disclosure also relates to the use of a device according to embodiments of the first aspect of the present disclosure for the detection and/or quantification of biological and/or chemical agents in the fluid. In embodiments, the present disclosure also relates to the use of a device according to embodiments of the first aspect of the present disclosure for the detection and/or quantification of target analytes such as proteins, antigens or antibodies. In embodiments, the present disclosure also relates to the use of a device according to embodiments of the first aspect of the present disclosure for environmental monitoring, toxicology, medical diagnostics and/or gas sampling.

The invention claimed is:

1. A device for measuring an optical absorption property of a fluid as a function of wavelength, the device comprising:
    a broadband light source for emitting light;
    a plurality of integrated optical waveguides for guiding the light, wherein each integrated optical waveguide comprises an optical resonator for filtering the light guided by the integrated optical waveguide according to a predetermined spectral component, and wherein the predetermined spectral component corresponding to each waveguide of the plurality of integrated optical waveguides is substantially different from the predetermined spectral component corresponding to another waveguide of the plurality of integrated optical waveguides, wherein the optical resonator filters the light in a spectral analysis zone;
    a light coupler for coupling the light emitted by the broadband light source into the plurality of integrated optical waveguides such that the light coupled into each of the integrated optical waveguides has substantially the same spectral distribution; and
    a microfluidic channel for containing the fluid, wherein the microfluidic channel is arranged as to allow an interaction of the light propagating through each of the integrated optical waveguides with the fluid when contained in the microfluidic channel, wherein the interaction of the light with the fluid occurs in an exposure zone that is physically distinct from the spectral analysis zone; and
    wherein after having interacted with the fluid in the exposure zone, the light enters the spectral analysis zone, the light thereby having a spectral composition carrying information about an absorption spectrum of the fluid.

2. The device according to claim 1, wherein at least one optical resonator is arranged such as to allow an interaction of the light in the optical resonator with the fluid.

3. The device according to claim 1, wherein at least one optical resonator comprises a narrow band resonator and/or a periodic wavelength resonator.

4. The device according to claim 1, wherein at least one optical resonator comprises an interferometer, a ring resonator, and/or a disc resonator.

5. The device according to claim 1, wherein the light coupler comprises:
    a collimator for collimating the light emitted by the broadband light source into a collimated radiation beam; and
    a beam shaper for distributing an optical power of the collimated light over a discrete number of line shaped light fields,
    wherein the beam shaper is arranged such that each line shaped light field is projected onto a light entry surface of a corresponding waveguide of the plurality of integrated optical waveguides.

6. The device according to claim 5, wherein the collimator has a parabolic shape, a conic shape, or a horn-like shape.

7. The device according to claim 5, wherein the beam shaper has a wedge shape, and wherein the collimator and the beam shaper are arranged such that the beam shaper can receive light from the collimator via a wedge entrance area forming a short side of the wedge.

8. The device according to claim 1, wherein each waveguide of the plurality of integrated optical waveguides is configured to keep the light travelling along different waveguides physically separate.

9. The device according to claim 1, wherein at least one waveguide of the plurality of integrated optical waveguides is curved in an interaction portion where the light propagating through the integrated optical waveguides can interact with the fluid when contained in the microfluidic channel.

10. The device according to claim 9, wherein at least one waveguide of the plurality of integrated optical waveguides has a spiral-like shape in the interaction portion.

11. The device according to claim 1, wherein the broadband light source comprises a light emitting diode or a broadband laser.

12. The device according to claim 1, further comprising a plurality of photodetectors, wherein each photodetector is optically coupled to a corresponding integrated optical waveguide of the plurality of integrated optical waveguides and adapted for receiving the light after being filtered by the corresponding optical resonator.

13. The device according to claim 12, further comprising a signal combiner adapted for receiving the signal from each of the plurality of photodetectors and for generating an aggregated signal representative of an absorption spectrum of the fluid.

14. The device according to claim 13, wherein the signal combiner is further adapted for generating a signal indicative of a presence and/or a concentration of a predetermined target biological and/or chemical agent in the fluid.

15. A diagnostic device for providing medical diagnostic information based on measurements of an optical absorption property of a biological fluid sample as a function of wavelength, the diagnostic device comprising a device according to claim 1.

16. The diagnostic device of claim 15, further comprising a processor configured for analyzing the measurements to determine at least one medically relevant parameter.

17. The device according to claim 1, wherein for each of the integrated optical waveguides, the exposure zone comprises a curved section that is curved with respect to a longitudinal axis of the integrated optical waveguide, the longitudinal axis corresponding to a principal direction of light conduction in the integrated optical waveguide, wherein the curved section has an extrinsic curvature of at least a reciprocal of the diameter of the microfluidic channel.

* * * * *